United States Patent
Shimoda et al.

(10) Patent No.: US 8,401,712 B2
(45) Date of Patent: Mar. 19, 2013

(54) METHOD FOR CONTROLLING DISTRIBUTED POWER SOURCES

(75) Inventors: Eisuke Shimoda, Sakura (JP); Shigeo Numata, Tokyo (JP); Toshihiro Yamane, Kawasaki (JP); Jumpei Baba, Tokyo (JP)

(73) Assignees: Shimizu Corporation (JP); The University of Tokyo (JP)

( * ) Notice: Subject to any disclaimer, the term of this patent is extended or adjusted under 35 U.S.C. 154(b) by 153 days.

(21) Appl. No.: 12/724,769

(22) Filed: Mar. 16, 2010

(65) Prior Publication Data
US 2011/0077792 A1  Mar. 31, 2011

(30) Foreign Application Priority Data

Sep. 3, 2009 (JP) ................................ 2009-204071

(51) Int. Cl.
*G06F 1/30* (2006.01)
*H02J 3/36* (2006.01)

(52) U.S. Cl. .................... 700/297; 700/286; 320/103

(58) Field of Classification Search ............. 700/22, 700/286, 295, 297; 320/103, 104, 126, 132, 320/135, 136, 149, 162
See application file for complete search history.

(56) References Cited

U.S. PATENT DOCUMENTS

| | | | | |
|---|---|---|---|---|
| 5,834,922 A * | 11/1998 | Ikawa et al. | .................... | 320/136 |
| 6,559,621 B2 * | 5/2003 | Corless et al. | ................. | 320/103 |
| 6,635,373 B2 * | 10/2003 | Kobayashi | .................... | 429/423 |
| 6,885,115 B2 * | 4/2005 | Hatori et al. | .................... | 307/80 |
| 6,891,279 B2 * | 5/2005 | Kazama | ....................... | 290/40 C |
| 7,449,864 B2 * | 11/2008 | Kwon et al. | ................... | 320/132 |
| 7,764,043 B2 * | 7/2010 | Toya et al. | ..................... | 320/103 |
| 7,786,703 B2 * | 8/2010 | Nakao | ............................ | 320/149 |
| 7,790,307 B2 * | 9/2010 | Kim | ............................... | 429/122 |
| 8,143,854 B2 * | 3/2012 | Maegawa et al. | ............. | 320/125 |
| 2004/0257044 A1 * | 12/2004 | Nagaoka | ........................ | 320/132 |
| 2006/0058897 A1 * | 3/2006 | Senda et al. | .................. | 700/286 |
| 2007/0035279 A1 * | 2/2007 | Kwon et al. | ................... | 320/132 |
| 2008/0036417 A1 * | 2/2008 | Toya et al. | ..................... | 320/103 |
| 2009/0009176 A1 * | 1/2009 | Nakao | ............................ | 324/432 |
| 2009/0107743 A1 * | 4/2009 | Alston et al. | .................. | 320/104 |
| 2010/0013324 A1 * | 1/2010 | Yamashita et al. | ............ | 307/125 |
| 2011/0025257 A1 * | 2/2011 | Weng | ............................. | 320/103 |

FOREIGN PATENT DOCUMENTS

JP  2006-246584 A  9/2006
JP  2007-20361 A  1/2007

* cited by examiner

*Primary Examiner* — Charles Kasenge
(74) *Attorney, Agent, or Firm* — Cantor Colburn LLP

(57) ABSTRACT

A control method of the present invention is a control method for distributed power sources which systematically controls a plurality of distributed power sources having different responsive capabilities for a load disturbance. The distributed power sources include an electricity storage device. The control method of the present invention includes: obtaining a component to be compensated for using a power source having a responsive capability equal to or lower than that of the electricity storage device based on a difference value between a remaining capacity of the electricity storage device and a target remaining capacity; and compensating for the component to be compensated for using the power source having a responsive capability equal to or lower than that of the electricity storage device.

2 Claims, 5 Drawing Sheets

METHOD FOR CONTROLLING DISTRIBUTED POWER SOURCES

BACKGROUND OF THE INVENTION

1. Field of the Invention

The present invention relates to a control method for compensating for load disturbances by systematically controlling a plurality of types of distributed power sources having different load-following capabilities for the load disturbances.

Priority is claimed on Japanese Patent Application No. 2009-204071, filed Sep. 3, 2009, the content of which is incorporated herein by reference.

2. Description of Related Art

Recently, power sources using solar photovoltaic or wind-power generation are being introduced and promoted as a national strategy. However, since power sources using natural energy such as solar photovoltaic or wind-power generation depend significantly on weather, there is concern that supply reliability may not be guaranteed, and supply-and-demand balance may be difficult to obtain in a commercial electricity system.

To address this problem, there is a microgrid which alleviates the load on a commercial electricity system and provides an interworking relationship by generating electricity to respond to demand within a certain area using distributed power sources capable of adjusting outputs (this is called a load-following operation). The energy supply system (hereinafter, referred to as a microgrid) using distributed power sources constructed by employing the microgrid concept to perform a load-following operation is advantageous in that: (1) it is possible to prevent the natural energy power sources having an unstable output from harming the commercial electricity system; and (2) in the event of abnormality in the commercial electricity system, such as interruption of an electricity service, it is possible to keep an autonomous operation with respect to the load within a corresponding area with a stable electricity service quality (frequencies or voltages) by disconnecting the microgrid from the commercial electricity system.

For example, Japanese Unexamined Patent Application, First Publication No. 2006-246584 (hereinafter referred to as Patent Document 1) discloses a method for performing the load-following operation of the distributed power source in the microgrid. In this control method, using a plurality of types of distributed power sources having different load-following capabilities, the load disturbance compensation is realized by setting, in advance, a frequency bandwidth of the load disturbance to be compensated for depending on the load-following capability of the distributed power source and controlling the output of the distributed power source to follow the load disturbance preferentially from the power source having a lower load-following capability.

The load disturbance compensation operation described in Patent Document 1 will be described with reference to FIG. 5. FIG. 5 is a control block diagram when output control of three power sources is performed. In this control method, the disturbance component of a measured load electric power $P_{LOAD}$ to be compensated for in a gas engine generator 1, amplitude of which is limited by an amplitude limiter 41, and further a predetermined frequency component of which is extracted by a LPS (low pass filter) 42, is set as an output specification value $Ps_G$ to the gas engine generator 1. The gas engine generator 1 outputs an electric power $P_1$ based on this output specification value. Moreover, a load disturbance that could not be followed using the gas engine generator 1, which is obtained by subtracting the output an electric power $P_1$ of the gas engine generator 1 from the load electric power $P_{LOAD}$, frequency of which is limited by an amplitude limiter 43, and further a predetermined frequency component of which is extracted by a LPF 44, is set as an output specification value $Ps_{BES}$ of a nickel metal hydride battery 2. The nickel metal hydride battery 2 outputs an electric power $P_2$ based on this output specification value. Furthermore, a load disturbance that could not be followed using the gas engine generator 1 and the nickel metal hydride battery 2, which is obtained by subtracting the output powers $P_1$ and $P_2$ of the gas engine generator 1 and the nickel metal hydride battery 2 from the load electric power $P_{LOAD}$, frequency of which is limited by an amplitude limiter 45, and further a predetermined frequency component of which is extracted by a LPF 46, is set as an output specification value $Ps_{EDLC}$ of an electric double-layer capacitor 3. The electric double-layer capacitor 3 outputs an electric power $P_3$ based on this output specification value. Through these control operations, the load disturbance compensation can be performed.

According to this control method of Patent Document 1, considering the load-following capabilities of the distributed power sources, an electricity storage device such as the secondary battery or the electric double-layer capacitor is usually used as a power source which compensates for the disturbance in the fastest frequency bandwidth. Since the chargeable/dischargeable capacity of the electricity storage device depends on the remaining capacity in the capacitor body (state of charge; hereinafter, referred to as SOC), if SOC management is not performed, it may be impossible to obtain a satisfactory output for the demanded output specification as the SOC increases or decreases. In this regard, the SOC management control is necessary to effectively implement the load-following operation in the electricity storage device having a storage capacity as small as possible. As a method for implementing the SOC management control, for example, using the electric double-layer capacitor, Japanese Unexamined Patent Application, First Publication No. 2007-020361 (hereinafter referred to as Patent Document 2) discloses a method for subtracting the difference between a setup value and a detection value of a direct-current from an output specification through a voltage controller configured by such as a PI controller or a PID controller.

However, even if the method of Patent Document 2 is used, since the electricity storage device autonomously adjusts the output of itself to perform the SOC management, the precision of the load-following operation may be degraded if means for compensating for the output fluctuation associated with the SOC management is not provided.

SUMMARY OF THE INVENTION

The present invention has been conceived in view of such circumstances. An object thereof is to provide a control method for distributed power sources capable of solving the aforementioned problems in that it may be impossible to obtain an output corresponding to the demanded output specification accompanying with the increase or decrease in the SOC of the electricity storage device, and the precision of the load-following operation may be degraded if the SOC management is performed by the electricity storage device itself.

A control method of the present invention is a control method for distributed power sources which systematically controls a plurality of distributed power sources having different responsive capabilities for a load disturbance. The distributed power sources include an electricity storage device. The control method of the present invention includes: obtaining a component to be compensated for using a power source having a responsive capability equal to or lower than that of the electricity storage device based on a difference value between a remaining capacity of the electricity storage device and a target remaining capacity; and compensating for the component to be compensated for using the power source having a responsive capability equal to or lower than that of the electricity storage device.

In the control method of the present invention, the electricity storage device may be an electric double-layer capacitor or a secondary battery, and the power source having a responsive capability equal to or lower than that of the electricity storage device may be a secondary battery or a synchronous generator.

According to the present invention, when the load-following operation is performed using a plurality of types of distributed power sources, by performing the SOC management of the electricity storage device using a power source having a responsive capability lower than that of the electricity storage device, it is possible to obtain effects that the SOC of the electricity storage device can be managed without degrading the control precision of the load-following operation, and that there are solved problems of the output power corresponding to the output specification not being obtained accompanying with the increase or decrease in the SOC of the electricity storage device, and the precision of the load-following operation being degraded.

DETAILED DESCRIPTION OF THE INVENTION

Figure 1:
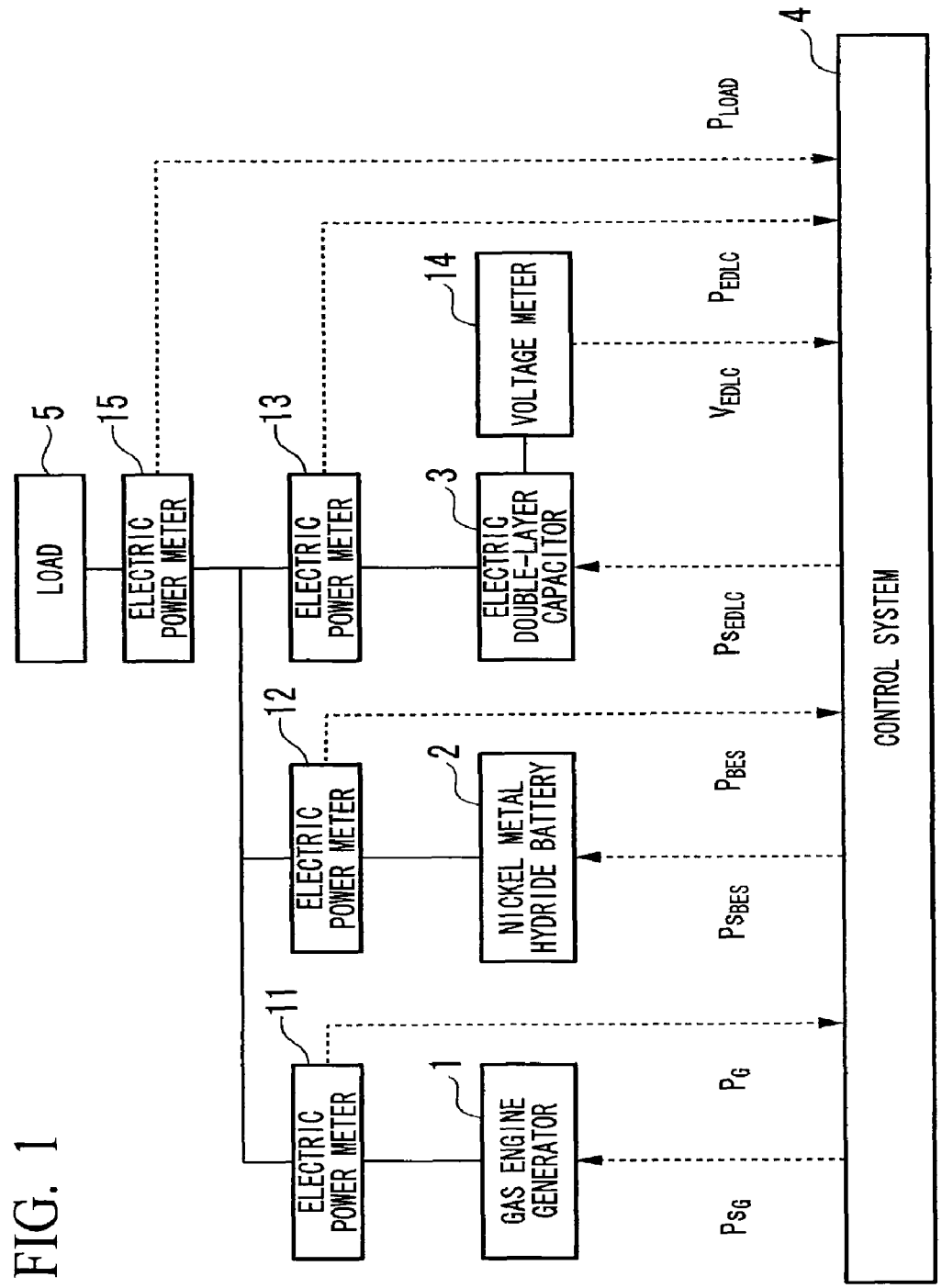
FIG. 1 is a block diagram illustrating a configuration according to an embodiment of the invention.

Hereinafter, a control method for distributed power sources according to an embodiment of the invention will be described with reference to the drawings. FIG. 1 is a block diagram illustrating a configuration of an energy supply system using distributed power sources according to the same embodiment of the invention. The energy supply system is constituted by a gas engine generator 1, a nickel metal hydride battery 2, an electric double-layer capacitor 3, and a control system 4 for controlling output an electric power. The gas engine generator 1 is provided with an electric power meter 11 which measures an active power ($P_G$) and outputs it to the control system 4. The nickel metal hydride battery 2 is provided with an electric power meter 12 which measures an active power ($P_{BES}$) and outputs it to the control system 4. The electric double-layer capacitor 3 is provided with an electric power meter 13 which measures an active power ($P_{EDLC}$) and outputs it to the control system 4, and a voltage meter 14 which measures a direct-current voltage ($V_{EDLC}$) and outputs it to the control system 4. Moreover, the output of an electric power meter 15, which measures a load electric power ($P_{LOAD}$) of a load 5, is input to the control system 4.

The control system 4 receives the measurement values $P_G$, $P_{BES}$, $P_{EDLC}$, $P_{LOAD}$, and $V_{EDLC}$ measured by the electric power meter 11, 12, 13, and 15 and the voltage meter 14, obtains active power output specifications $Ps_G$, $Ps_{BES}$, and $Ps_{EDLC}$, and outputs them to the gas engine generator 1, the nickel metal hydride battery 2, and the electric double-layer capacitor 3 to perform a control operation so that a stable electric power can be supplied.

Figure 2:
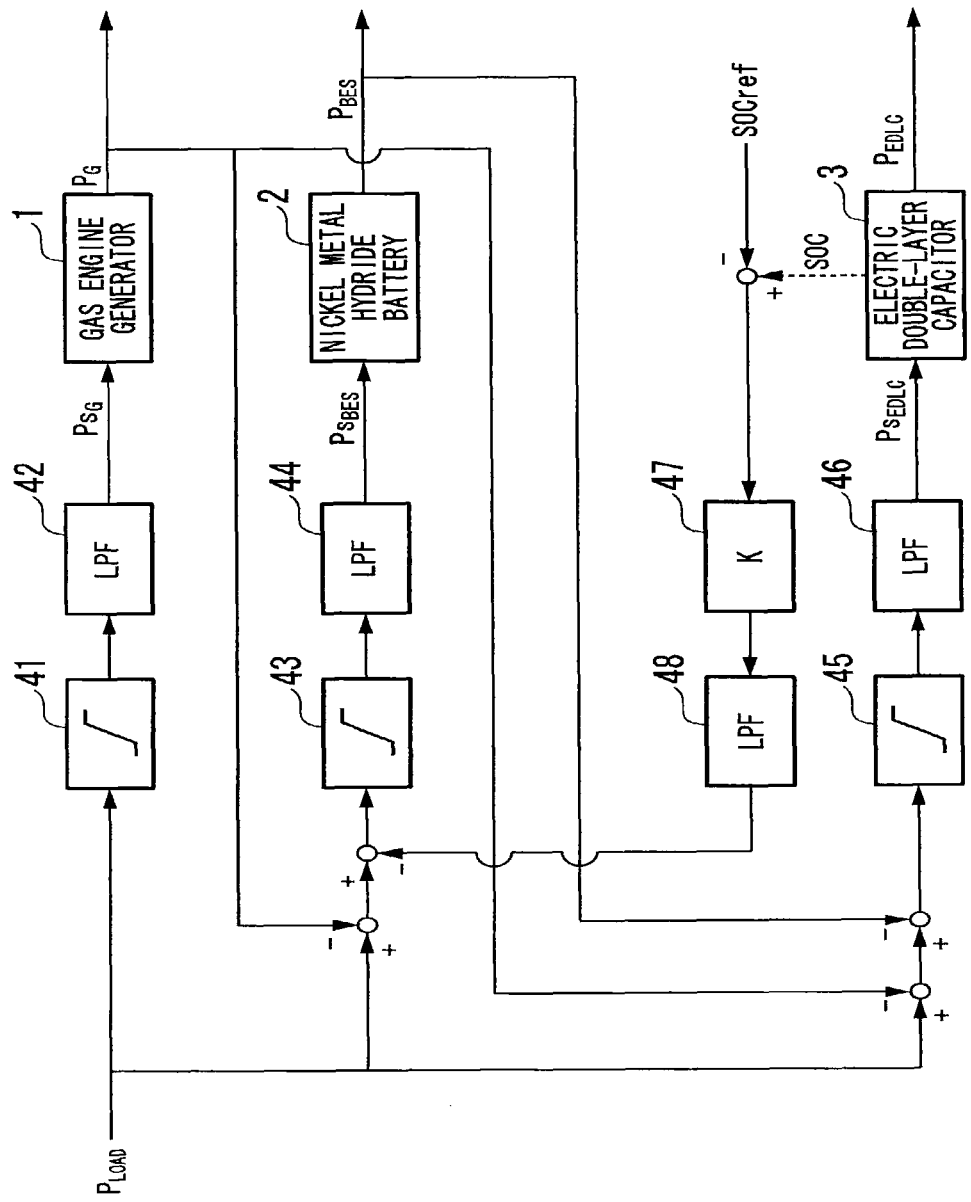
FIG. 2 is a control block diagram illustrating a constitution of a control system shown in FIG. 1.

Next, an operation of performing the load-following operation of each power source while performing the SOC management in the control system 4 shown in FIG. 1 will be described with reference to FIG. 2. FIG. 2 is a control block diagram illustrating a configuration within a control system 4. Out of three power sources shown in FIG. 1, both the nickel metal hydride battery 2 and electric double-layer capacitor 3 are electricity storage devices demanding the SOC management. However, here, it is assumed that only the electric double-layer capacitor 3 having a particularly small capacity is set as an SOC management target, and the SOC of the electric double-layer capacitor 3 is managed using the nickel metal hydride battery 2.

If the electric double-layer capacitor 3 is substituted by a simple model as a condenser, a proportional relationship of $Q=CV_{EDLC}$ can be established between the direct current voltage $V_{EDLC}$ and the charge amount Q, and thus, it is possible to obtain the SOC value by measuring the DC voltage $V_{EDLC}$. In the system configuration shown in FIG. 1, $V_{EDLC}$ is measured using the voltage meter 14, and this value is set as the SOC value.

Figure 5:
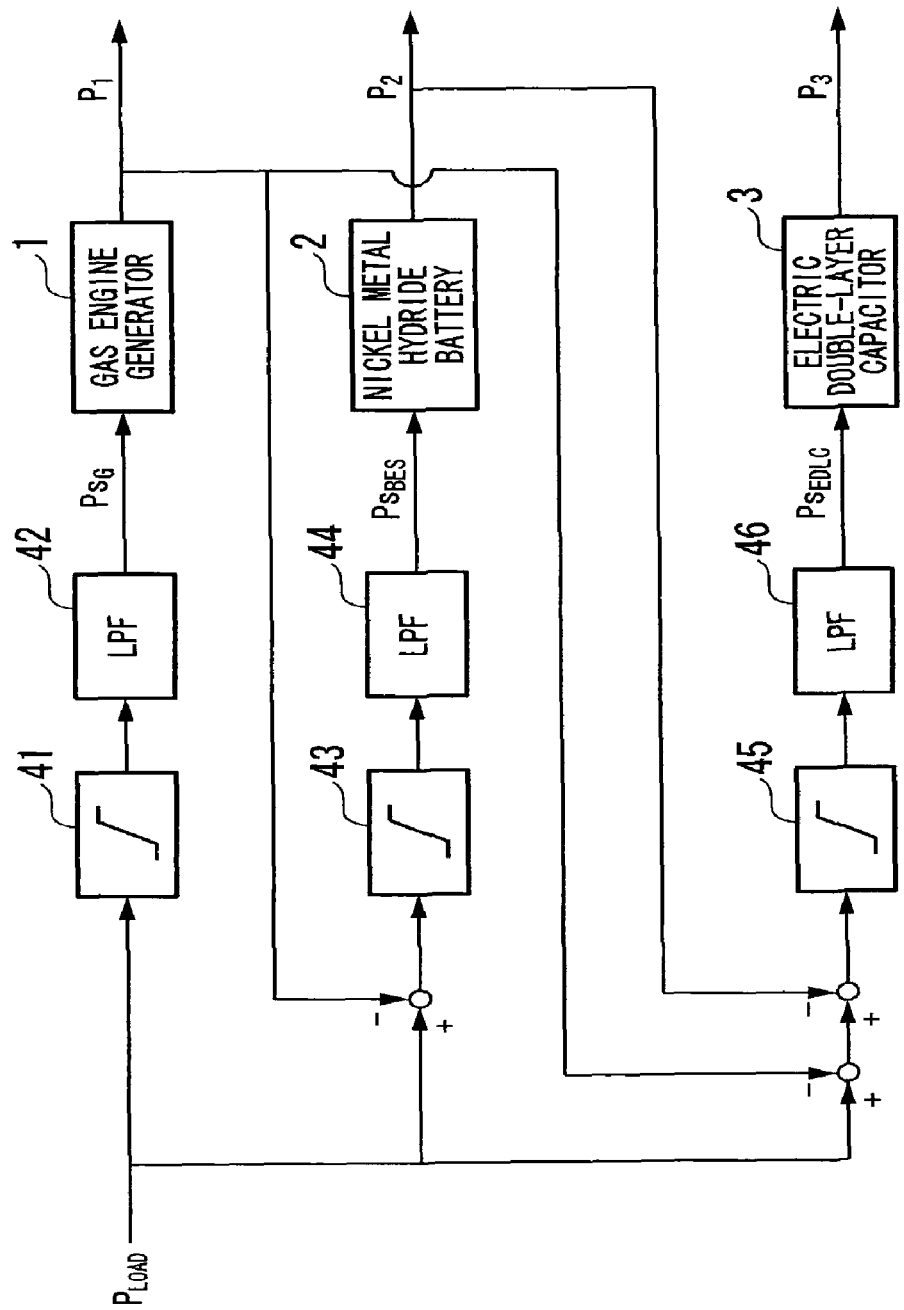
FIG. 5 is a control block diagram illustrating a conventional control operation of distributed power sources.

In FIG. 2, same reference symbols denote same elements as in the conventional control block shown in FIG. 5, and descriptions thereof will be omitted. The control block shown in FIG. 2 is different from the conventional control block shown in FIG. 5 in that, the SOC (direct current voltage $V_{EDLC}$) of the electric double-layer capacitor 3, which is the SOC management target, is measured, the difference between it and a predetermined SOC management reference value SOCref is calculated, the difference is multiplied by a proportional gain K using a multiplier 47, and thereafter, a component that can be compensated for in the nickel metal hydride battery 2 is extracted using a LPF 48, and that value is subtracted from the output specification of the nickel metal hydride battery 2. In this configuration, it is possible to control output powers of each power source while managing the SOC value.

In FIG. 2, the difference between the SOC and the SOCref is multiplied by the proportional gain K using the multiplier 47, and the result is input as the specification value of the nickel metal hydride battery 2 via the LPF 48. However, a proportional-plus-integral controller may be used instead of the multiplier 47 for multiplying the proportional gain K and the LPF 48. Moreover, the SOC management control may be performed using the gas engine generator 1 which has a lower load-following capability than that of the electricity storage device.

Figure 3:
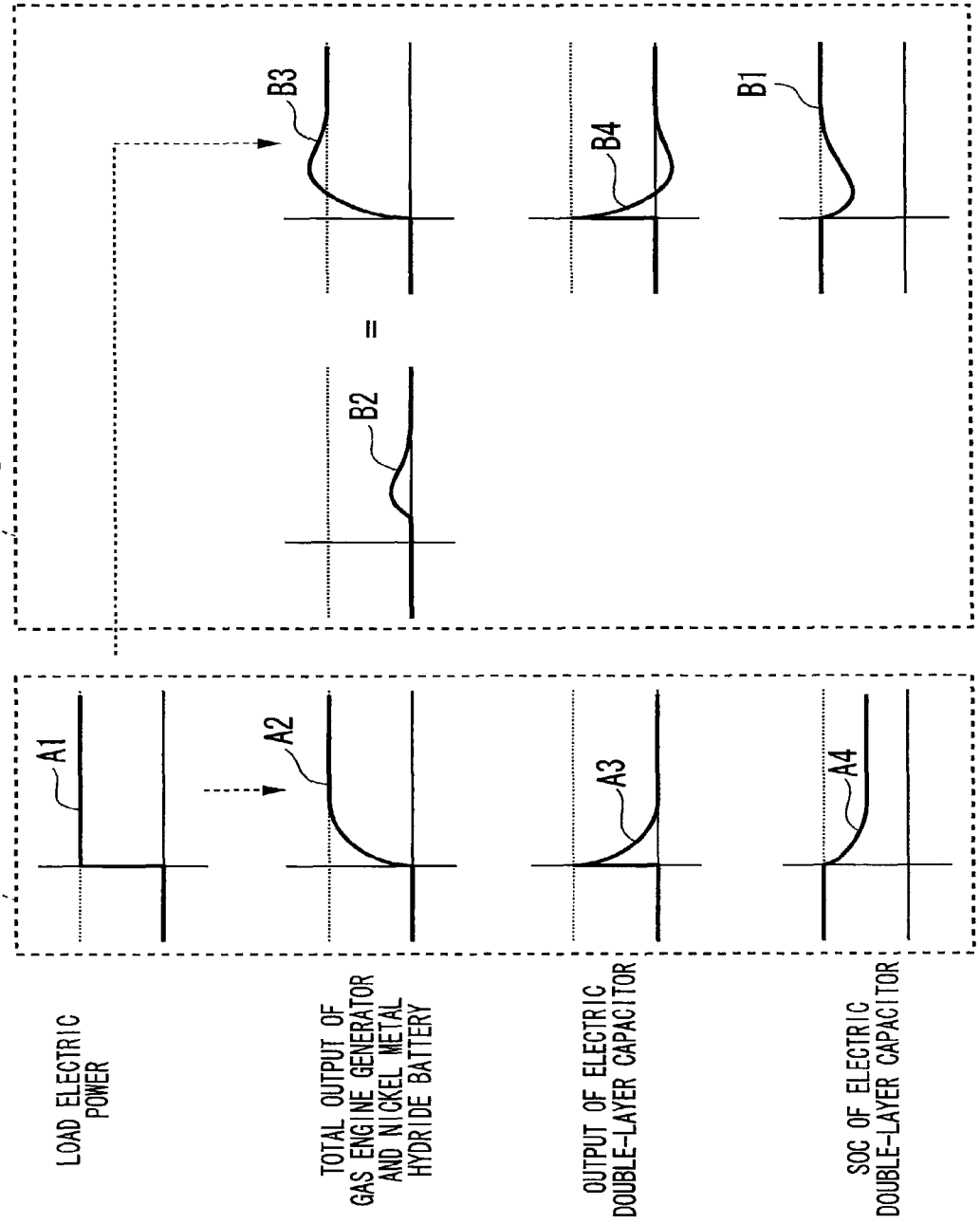
FIG. 3 illustrates output behaviors of three power sources shown in FIG. 1.

Next, a control operation of controlling the output of each power source by managing the SOC will be described with reference to FIG. 3. A section of FIG. 3 illustrates a control operation according to a conventional control method (A section of FIG. 3), and an operation of the SOC management control of electric double-layer capacitor 3 according to the present invention (B section of FIG. 3). In the event that a load disturbance (reference symbol A1) having a step shape is added at a certain time point, the outputs of each power source change as indicated by the reference symbols A2 and A3 of FIG. 3 according to the control method described in Patent Document 1 (FIG. 5). As a result, the SOC of the electric double-layer capacitor 3 is lower than in the initial state (reference symbol A4).

On the other hand, in accordance with the control method according to the present invention (B section in FIG. 3), as the SOC of the electric double-layer capacitor 3 is lowered (reference symbol B1), the output shown as the reference symbol B2 is added to the output specification value of the gas engine generator 1 or the nickel metal hydride battery 2 which has a lower responsive capability than that of the electric double-layer capacitor 3. As a result, the total output of the gas engine generator 1 and the nickel metal hydride battery 2 has an output shown as the reference symbol B3. Since the output of the electric double-layer capacitor 3 changes to perform the charging operation after the discharging operation so that the total output of all power sources matches with the load electric power (reference symbol B4), the SOC of the electric double-layer capacitor 3 can be recovered. In other words, it is possible to rapidly recover the remaining capacity of the electricity storage device (the electric double-layer capacitor 3) by increasing the output of the power source (the nickel metal hydride battery 2) except for the electricity storage device than the load electric power after discharging the electric power from the electricity storage device (the electric double-layer capacitor 3).

Figure 4A:
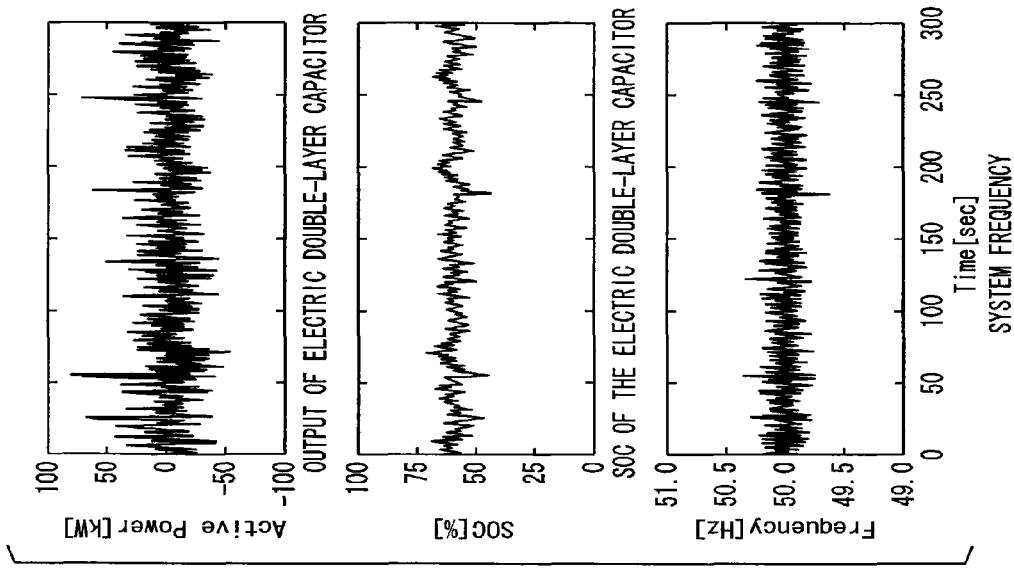
FIG. 4A illustrates a result of an operation when a SOC management control is not performed.
Figure 4B:
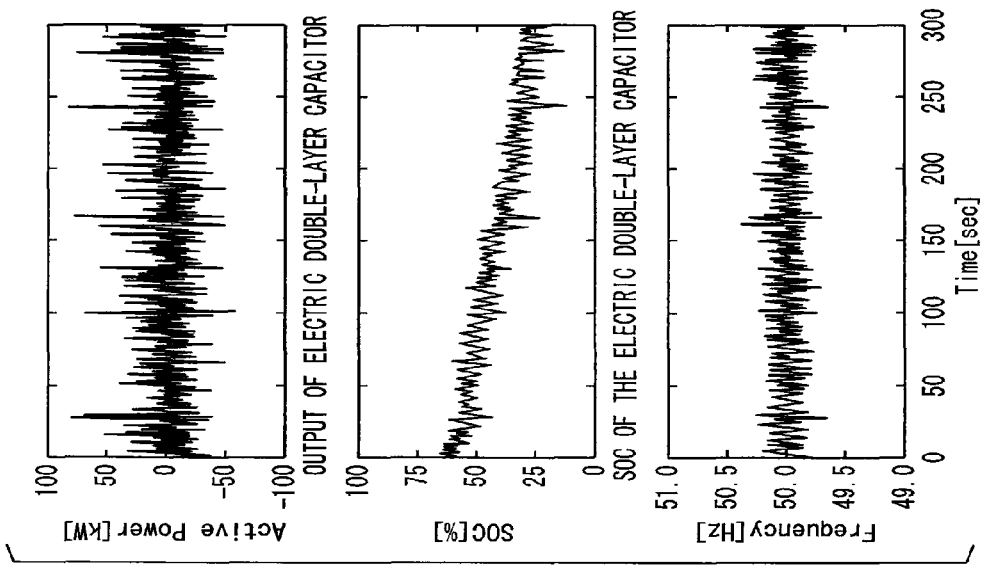
FIG. 4B illustrates a result of an operation when a SOC management control is performed.

Next, results of the operations when the SOC management control is performed and when the SOC management control is not performed will be described with reference to FIGS. 4A and 4B. FIG. 4A illustrates a result of an operation when the SOC management control is not performed. FIG. 4B illustrates a result of an operation when the SOC management control is performed. The operation voltage range of the electric double-layer capacitor 3 is 240 to 400 V, which corresponds to the range of the SOC value 0 to 100%. A standard voltage of the electric double-layer capacitor 3 is 336 V (60% of the SOC value). From FIGS. 4A and 4B, it is recognized that the SOC value is lowered to approximately 25% at the time point of 300 sec when the SOC management control is not performed, while the SOC value can be normally maintained at approximately 60% when the SOC management control is performed. By monitoring the system frequency variation width of the microgrid, it is possible to recognize how precisely the load-following operation is realized. Even by comparing with the operation when the SOC management control is not performed, it is recognized that the system frequency variation width is not quite different, and the precision of the load-following operation is not degraded.

While, in the aforementioned descriptions, the electric double-layer capacitor, the nickel metal hydride battery, and the gas engine generator are employed, any types of batteries may be employed only if it is a secondary battery, and moreover, any types of generators may be employed only if it is a synchronous generator. The secondary battery refers to a chargeable/dischargeable battery and includes a lead-acid storage battery, an NAS battery and a lithium ion battery as well as a nickel metal hydride battery. The gas engine generator may be substituted with any other type of synchronous generator such as a gas turbine generator or a diesel engine generator in addition to the gas engine synchronous generator.

As described above, when the load-following operation is performed using a plurality of types of distributed power sources, it is possible to manage the SOC of the electricity storage device (e.g., the electric double-layer capacitor 3) without degrading the control precision of the load-following operation by performing the SOC management using a power source (e.g., the nickel metal hydride battery 2) having a lower responsive capability than that of the electricity storage device. Therefore, it is possible to prevent the performance degradation of the load-following operation accompanying with the increase or decrease in the SOC of the electricity storage device. In addition, it is possible to prevent degradation in the load-following operation performance of the electricity storage device when the SOC management is performed by the electricity storage device itself. Moreover, since the capacity of the electricity storage device included in the distributed power source can be reduced by managing the SOC, it is possible to reduce the cost of the system.

While preferred embodiments of the invention have been described and illustrated above, it should be understood that these are exemplary of the invention and are not to be considered as limiting. Additions, omissions, substitutions, and other modifications can be made without departing from the scope of the present invention. The invention is not to be considered as being limited by the foregoing description, and is only limited by the scope of the appended claims.

What is claimed is:

1. A control method for systematically controlling a plurality of distributed power sources having different responsive capabilities for a load disturbance, the distributed power sources including an electricity storage device, and a power source having a responsive capability equal to or lower than that of the electricity storage device, the method comprising:

outputting a power from the electricity storage device based on a difference value between a load electric power and a power from the power source, at the same time as outputting the power from the power source based on the load electric power;

obtaining a component to be compensated for using the power source based on a difference value between a remaining capacity of the electricity storage device and a target remaining capacity; and obtaining an output specification value of the power source based on the load electric power;

adding the component to be compensated for to the output specification value to thereby obtain an output power of the power source, the output power of the power source being greater than the load electric power;

outputting the output power of the power source from the power source; and charging the electricity storage device with the output power of the power source in order to match total of the output power of the power source and an output power of the electricity storage device with the load electric power.

2. The control method for distributed power sources according to claim 1, wherein the electricity storage device is an electric double-layer capacitor or a secondary battery, and the power source having a responsive capability equal to or lower than that of the electricity storage device is a secondary battery or a synchronous generator.

* * * * *